March 6, 1928.

C. E. GARDNER 1,661,721

APPARATUS FOR GRINDING OR COMMINUTING RUBBER AND OTHER MATERIALS

Filed May 7, 1927

Inventor.
Charles E. Gardner,
By
Atty.

March 6, 1928.  
C. E. GARDNER  
APPARATUS FOR GRINDING OR COMMINUTING RUBBER AND OTHER MATERIALS  
Filed May 7, 1927  
1,661,721  
9 Sheets-Sheet 2
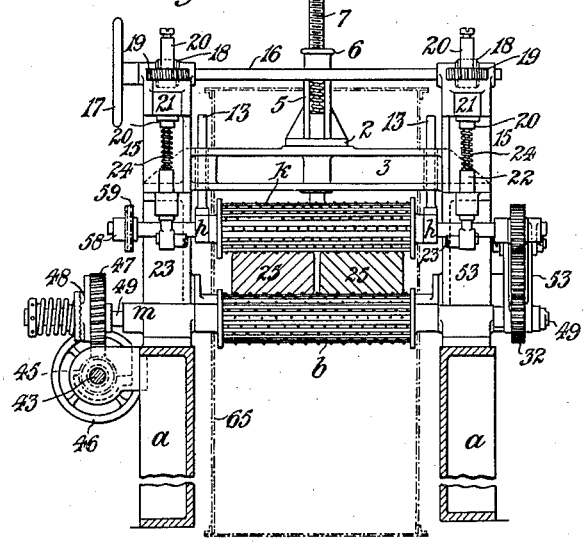
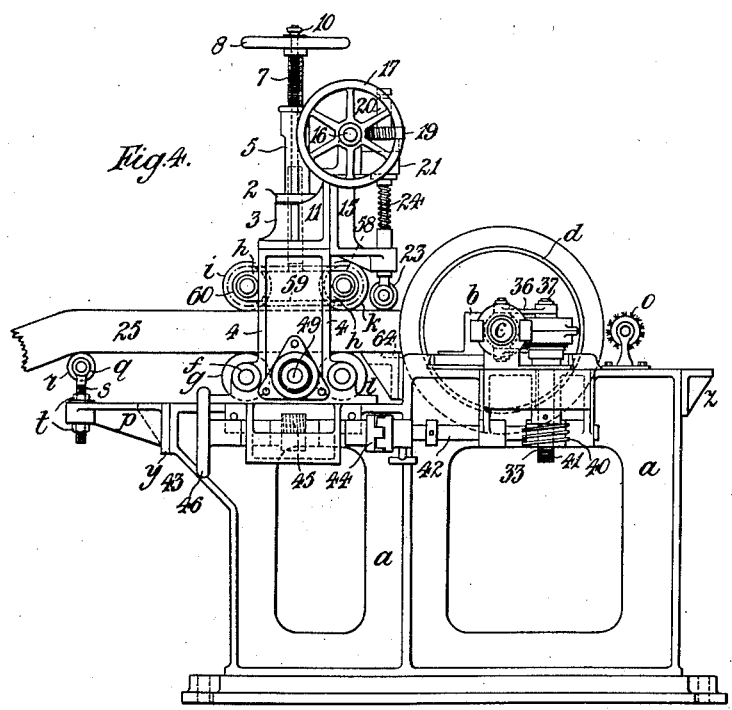
Inventor.  
Charles E. Gardner,  
By  
atty.

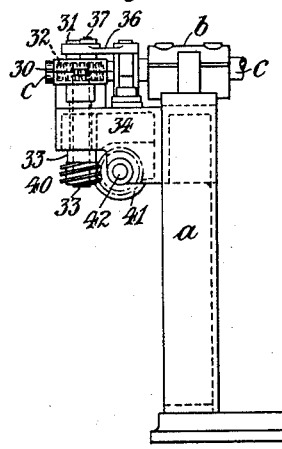
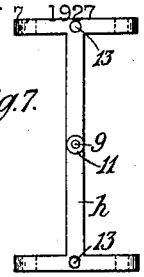
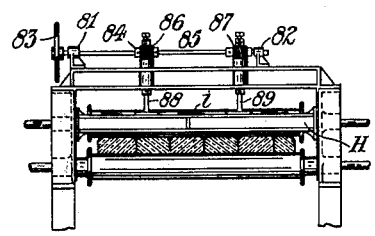
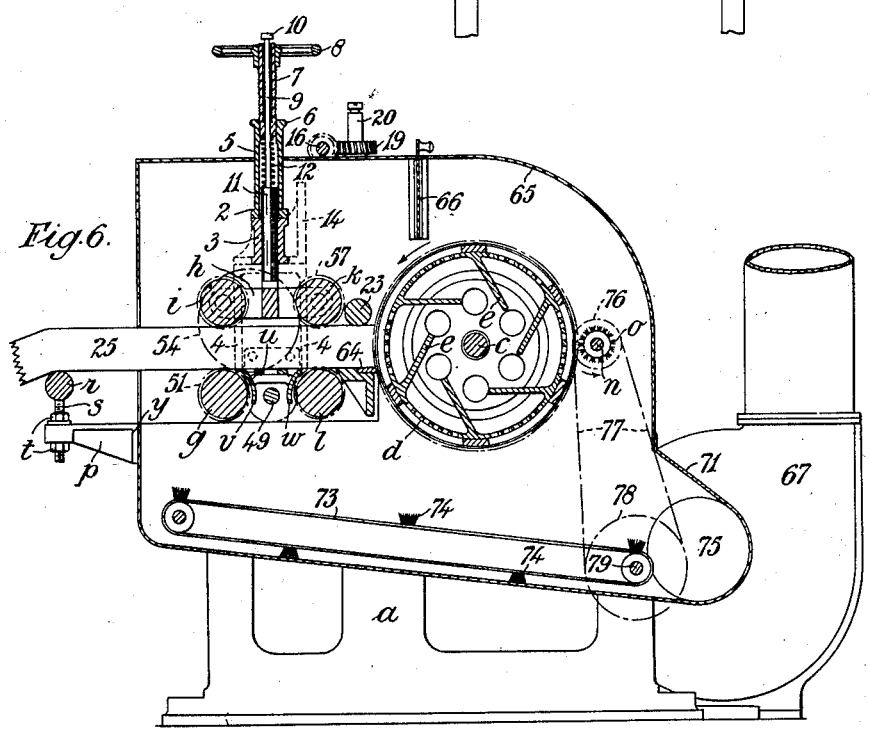

March 6, 1928. 1,661,721
C. E. GARDNER
APPARATUS FOR GRINDING OR COMMINUTING RUBBER AND OTHER MATERIALS
Filed May 7, 1927 9 Sheets-Sheet 4

Inventor.
Charles E. Gardner,
By [signature]
Atty.

March 6, 1928. 1,661,721
C. E. GARDNER
APPARATUS FOR GRINDING OR COMMINUTING RUBBER AND OTHER MATERIALS
Filed May 7, 1927 9 Sheets-Sheet 5

Inventor.
Charles E. Gardner,
By [signature]
atty

March 6, 1928. 1,661,721
C. E. GARDNER
APPARATUS FOR GRINDING OR COMMINUTING RUBBER AND OTHER MATERIALS
Filed May 7, 1927 9 Sheets-Sheet 6
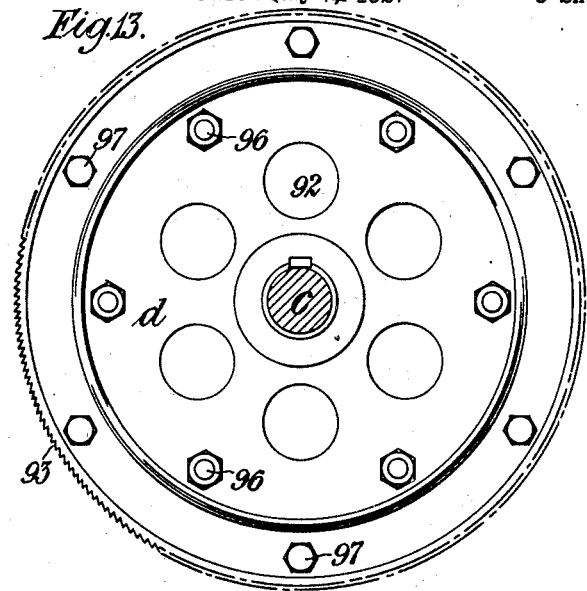
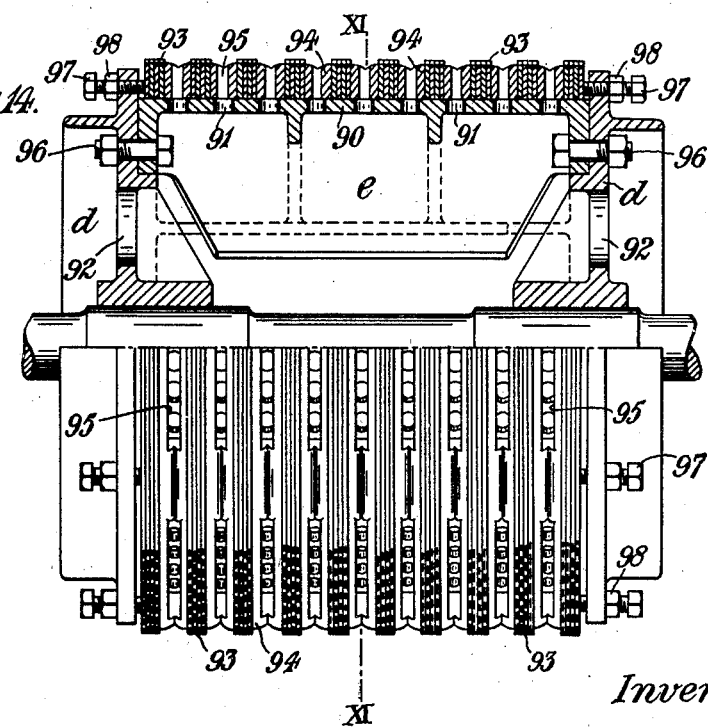
Inventor.
Charles E. Gardner March 6, 1928.
C. E. GARDNER
1,661,721
APPARATUS FOR GRINDING OR COMMINUTING RUBBER AND OTHER MATERIALS
Filed May 7, 1927   9 Sheets-Sheet 7
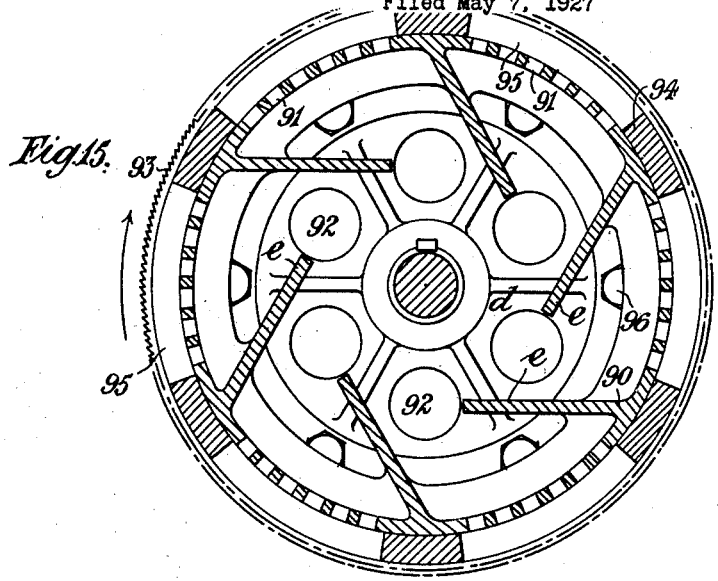
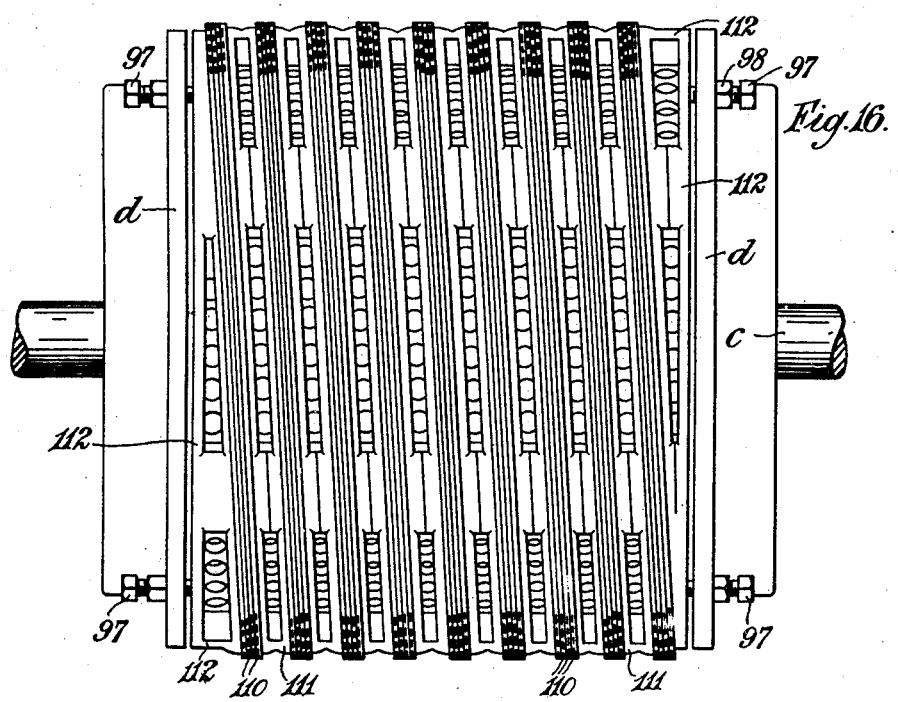
Inventor:
Charles E. Gardner,
By [signature]
Atty.

March 6, 1928.
C. E. GARDNER
1,661,721
APPARATUS FOR GRINDING OR COMMINUTING RUBBER AND OTHER MATERIALS
Filed May 7, 1927
9 Sheets-Sheet 8
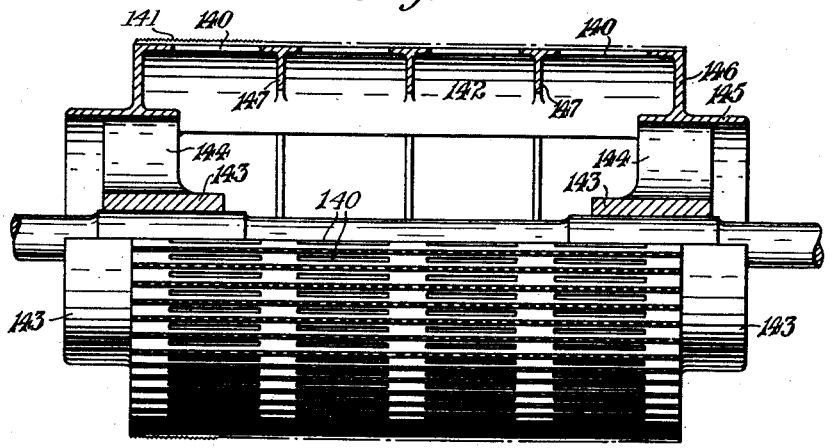
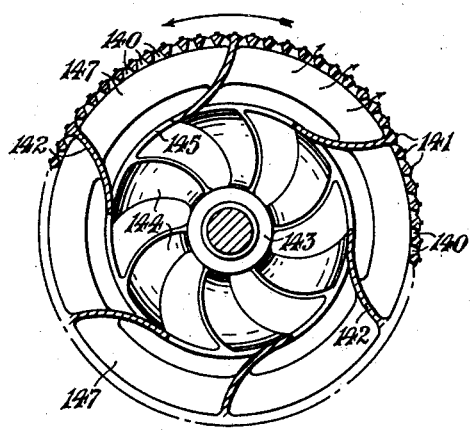
Inventor.

March 6, 1928. 1,661,721
C. E. GARDNER
APPARATUS FOR GRINDING OR COMMINUTING RUBBER AND OTHER MATERIALS
Filed May 7, 1927 9 Sheets-Sheet 9
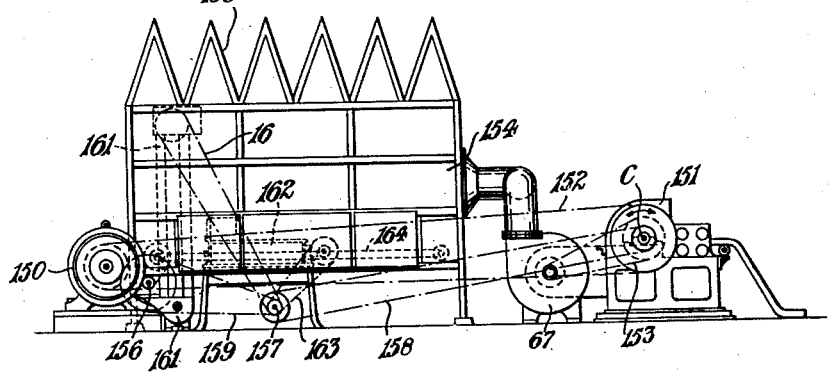
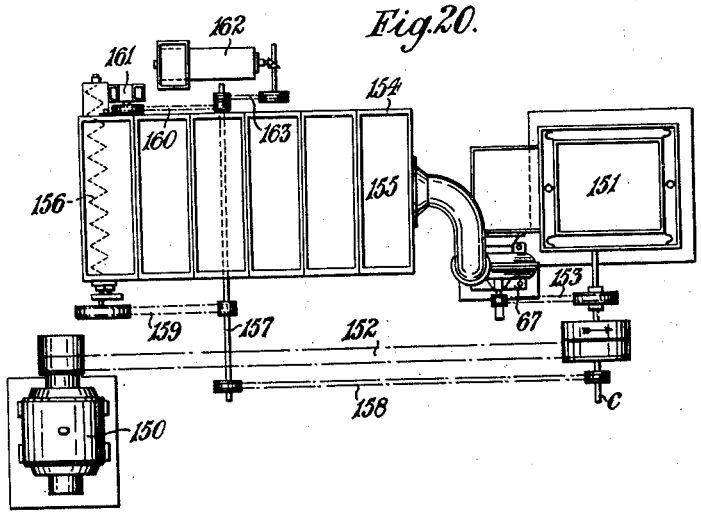
Inventor.
Charles E. Gardner,
By
atty.

Patented Mar. 6, 1928.

1,661,721

UNITED STATES PATENT OFFICE.

CHARLES EDWARD GARDNER, OF GLOUCESTER, ENGLAND.

APPARATUS FOR GRINDING OR COMMINUTING RUBBER AND OTHER MATERIALS.

Application filed May 7, 1927, Serial No. 189,654, and in Great Britain February 19, 1926.

This invention relates to improvements in apparatus for grinding or comminuting rubber and other substances, such as wood, for making wood-dust or wood-flour, cork for the manufacture of linoleum, the bark of trees, dried roots for medicinal and other purposes, and other materials adapted to be reduced to small pieces or dust.

According to this invention, the machine is provided with two or more upper positively driven feed-rollers and two or more lower positively driven feed-rollers for feeding positively the material to and abrading drum the upper feed-rollers being elastically mounted and vertically adjustable. The upper and/or lower feed-rollers may be furnished with studs or spikes or they may be corrugated so as to firmly grip the material between them. A further advantage obtained by positively driving the upper feed rollers also resides therein that the strain on the pins or spikes of the lower rollers is materially lessened when the upper rollers are also driven positively and breakages are avoided. Between the front and rear lower rollers and level with the top thereof is mounted a perforated table or ridge-piece over which the material passes. At the rear of the upper feed-rollers and close to the abrading drum there is or may be mounted parallel thereto a single roller which is frictionally driven by engagement with the rubber or other material or it may be positively driven. This rearmost roller is adjustably and elastically mounted and below it there is a perforated mouthpiece or table which forms a path for the material between the upper and lower rear feed-rollers and the abrading drum. The feed-rollers are driven at a relatively slow speed by means of suitable gearing from the shaft of the abrading drum or other suitable shaft and means, such as a slipping or friction coupling, are provided for preventing the too rapid feed of the material owing to unusual hardness or toughness of the material being ground. The machine is also furnished with means for positively putting out of gear the automatic feed of the feed-rollers and with means for feeding the material by hand away from the abrading drum prior to stopping the machine or towards the abrading drum when the machine is being started, in order to prevent the braking action and consequent heating and the inadequate comminution which ensues if the material remains or comes into too intimate a contact with the abrading drum when the speed of the drum is diminishing or slow prior to stopping or on the machine being started and more particularly with a full load. It will be understood that the heating principally occurs when grinding such a material as rubber and over-heating in that case is extremely objectionable inasmuch as it causes the rubber to melt or fuse and become sticky, in addition to which powder, already formed by grinding, adheres to the sticky mass. The upper feed-rollers are conveniently mounted in a vertically guided, adjustable and elastically mounted frame and are positively driven by suitable means from one of the lower feed-rollers.

As it sometimes happens that some pieces of rubber to be ground are much thinner than others, an additional feeding device is conveniently employed and it consists of a positively driven roller provided with spikes over which all the pieces of rubber pass side by side to the two pairs of positively driven feed rollers. The action of this additional feed roller may also be assisted by a series of positively driven and oscillating or reciprocating spike-devices which are caused to fall, penetrate the top of the rubber and draw it along towards the two pairs of feed rollers. Otherwise, the thinner piece or pieces of rubber lag behind or are not passed through to the grinding drum in such a manner as to be properly ground.

As some pieces of rubber may also be narrower than others or one piece may be ground into powder before another is inserted to take its place or a piece may pass beyond the feed rollers, remaining in the space between them and the grinding drum and become displaced, thereby causing obstruction, adjustable and if desired removable guides are provided to ensure that each piece maintains its correct position.

In order to prevent heating of the rubber or other material, the casing surrounding the abrading drum is made very much larger than hitherto so as to allow ample space for air (which is admitted through a large opening or openings at one side or at both sides of the machine) to circulate around the abrading drum and the latter is also open or furnished with apertures at one or both of its ends and also with large slots and/or holes between the abrading devices, so that a large volume of cool air may be delivered by a number of tangentially arranged impelling vanes mounted within the abrading drum (aided if desired by a fan mounted on the shaft or integral with the ends of the abrading drum or mounted elsewhere) through the apertures into and around the abrading drum, all round the abrading devices mounted on the drum and in intimate contact with the surface of the material being ground. The vanes in the drum are, as stated, tangential and they project inwardly from the inner periphery of the drum to about midway of its radius. Air is also suitably withdrawn from the casing by means of a rotary suction-fan or the like adapted to produce the necessary currents of air for removing powder produced by the abrading action of the drum, to prevent clogging and deliver the powder to the collector or receptacle without loss. The casing is also provided with an adjustable regulating gate at or near the upper part of the casing between the said casing and the abrading drum and in the neighbourhood of the place where the grinding or abrading is effected, the object being to increase or reduce the pressure of the air current or currents to suit the consistency or toughness of the rubber or the like.

Some materials, and particularly some kinds of rubber, have a relatively large degree of adhesiveness and in order to prevent the powder from adhering to the walls or surfaces of the slots or holes in the abrading drum, a positively driven rotary brush is provided in order to brush the surface of the drum. To some extent, this brush also keeps the abrading teeth clear of material. The centre portion or barrel of the abrading drum is furnished with a number of segmentally and/or axially arranged holes or slots at suitable distances apart to allow of the through passage of cooling air entering through the holes in the end or ends of the drum to the impelling vanes which deliver it, aided by the suction fan, to the cutters or abrading devices and the material being cut. The cutters or abrading devices consist of externally serrated rings, of hard steel mounted on the drum in groups, with annular and perforated or slotted distance-pieces mounted in between them and suitably secured by clamping means, such as set screws passing through screw-threaded holes in the discs or ends of the drum. Or the cutters may be in segments with perforated or slotted segmental distance-pieces separating the groups of cutters. Or the cutters may be arranged partly in segmental groups and partly axially or the cutters may be in the form of elliptical rings separated by intermediate elliptical annular distance-pieces and provided with wedge-shaped terminal distance-pieces. Or the abrading teeth may be formed integral with the drum, with intervening holes or slots for the passage of the cooling air.

And in order that the invention may be readily understood and carried into effect, reference will be made to the accompanying drawings, in which:—

Figure 3 is a sectional elevation of the machine, taken about on the line III—III Figure 2 and viewed from the rear.

Figure 4 is a right hand side elevation of the machine with the hood removed.

Figure 5 is a detail end elevation of the means for the axial reciprocation of the abrading drum and part of the gear for automatically rotating the feed-rollers.

Figure 6 is a longitudinal section of the machine viewed from the right hand side thereof and Figure 7 is a detailed plan view of the H-frame $h$ in which the upper feed-rollers $i$ and $k$ are mounted.

Figure 8 is a front or end elevation of part of the machine with a modified arrangement of mechanism for raising or lowering the upper feed-rollers by hand.

Figure 13 is a side elevation of the abrading drum.

Figure 14 is a view partly in front elevation and partly in section of the abrading drum and Figure 15 is a transverse section thereof.

Figure 16 is a front elevation of another modification of grinding drum.

Figure 17 is a sectional elevation of yet another modification of grinding drum in which the cutting teeth are cast integral with the shell of the drum itself and the ends of the drum are formed with vanes for assisting the flow of air to the air apertures or slots between the rows of cutting teeth and Figure 18 is a view partly in end elevation and partly in section of the drum shown in Fig. 17.

Figure 19 is a more or less diagrammatic sectional elevation of a complete installation, and Figure 20 is a plan thereof.

On referring to Figures 1 to 7 of the drawings, it will be seen that the machine comprises a frame-work consisting of side-frames *a*, connected together at a suitable distance apart and having mounted thereon bearings *b* for the shaft *c* of an abrading drum *d*, furnished with impeller vanes *e*. There are mounted on the frames *a* bearings *f* for the lower front feed-roller *g* and bearings in a vertically movable H-shaped frame *h*, (Figures 2, 3, 4, 6 and 7) for the upper front and rear feed-rollers marked *i* and *k* respectively. The lower rear feed-roller *l* is mounted in bearings *m* on the frame members *a*. The feed-rollers or some of them are spiked and/or may be corrugated to grip the rubber 25 or other material being fed towards the abrading drum *d*. The frame-members *a* are also provided at the back of the drum with bearings *n* for a rotary brush *o*. In addition the frame is also furnished with two brackets *p*, on each of which is mounted a bearing *q* in front of the feed-rollers *g* and *i* to receive a freely revoluble plain roller *r* on which the material is adapted to be supported and guided as it is being fed towards the abrading drum *d*. These guide roller bearings are conveniently provided with screw-threaded stems *s* and nuts *t* so as to permit of adjusting them as to height on the brackets *q*. The lower front feed roller *g* and the rear feed roller *l* have between them, and level with the top thereof, a perforated or slotted table *u* having front and rear depending ends *v* and *w* curved with a radius slightly greater than that of the feed-rollers and so that the spikes (and/or corrugations) on the feed rollers just clear the said ends. The perforations in the table *u* enable any dust thrown over by the abrading drum to be drawn through them by the draught set up by a fan, to be hereinafter described, the curved ends or webs *v* and *w* strengthen the table and allow space for the shaft 49 to pass through. The two side frames are connected together to ensure rigidity by other suitable frame members, such as for example those marked *y* and *z*.

Figure 2:
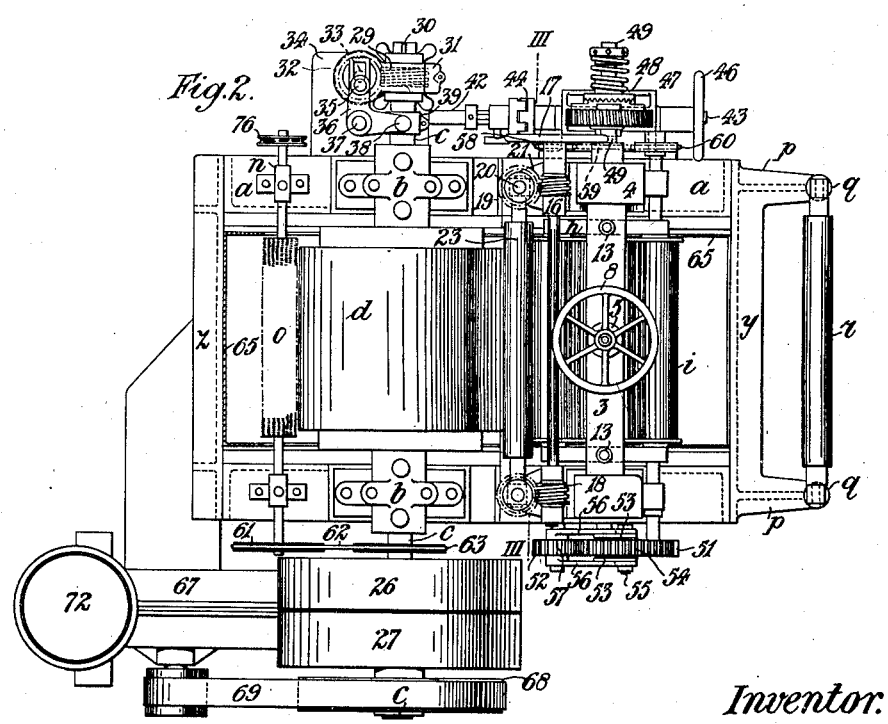
Figure 2 is a plan of the machine with the hood removed and showing also the suction-fan.

Above the upper feed-rollers is mounted a bracket 2 on a bridge-piece or girder 3 bolted at each end to a pair of vertical guides 4 each in turn fixed to a frame member *a* and carrying the bearings *f* and *m* of the lower feeding rollers *g* and *l*. The bracket 2 has mounted thereon, or integral therewith, a central vertical socket, casing or cylindrical housing 5 furnished with a nut 6 (best seen in Figure 6) in which is mounted a hollow screw 7 provided with a handwheel 8. Projecting upwards through the hollow screw 7 is a rod 9 of smaller diameter than that of the hollow screw and provided at the top with a small collar 10 to prevent it from dropping through the screw. The rod 9 is furnished at some distance below the nut with a long collar or cylindrical enlargement 11 which fits easily within the cylindrical casing 5 and bridge-piece or girder 3 and a coiled spring 12 surrounding the rod abuts at one end against the screw 7 and at the other end against the long enlargement or collar 11. The lower end of the rod 9 has fixedly mounted thereon the horizontal rectangular H-shaped frame *h* (see also Figure 7) carrying at each side the two bearings of the upper rollers *i* and *k*. This frame *h* is adapted to slide in and be guided by the vertical guides 4 to permit the said rollers to accommodate themselves within a wide range to feed material of different thicknesses single or in layers and in addition, the frame is also conveniently furnished with vertical rods 13 adapted to slide up and down in holes in the bridge-piece or girder 3 in order to ensure, as far as possible, that the upper feed rollers shall always remain horizontal. At the back of each of the terminal vertical members or flanges 14 of the bridge-piece is rigidly fixed a bracket 15, horizontally perforated at the top to provide bearings for a cross-shaft 16, having a hand wheel 17 keyed thereto. This cross-shaft 16 is provided near each end, with a worm 18 adapted to engage a worm-wheel 19 mounted near each side of the machine on a vertical screw 20, passing through a nut 21 in the upper part of the bracket. This screw 20 is telescopically connected to a stem 22 guided in the lower part of the bracket and furnished with a bearing for the spindle of a roller 23. A spring 24 between the two telescopic parts 20 and 22 enables the roller 23 to press elastically on the rubber 25 or other material just before it comes into contact with the abrading drum *d*. It will, however, be evident that any suitable means for enabling this roller 23 or the front feed roller *i* and the rear roller *k* to press elastically on the rubber or other material may be employed. The abrading drum is provided, as shown in Figure 2, with fast pulley 26 and loose pulley 27 and striking gear (not shown), a clutch or the like so as to enable the machine to be driven and stopped when required.

It should be noted that the abrading drum *d* is conveniently made of the type adapted to be reciprocated or to produce the equivalent effect and the construction is varied according to the work to be done but, in any case, the slots or openings in the drum (to be presently more fully described) are as large as possible in order to permit a free passage of the cooling air.

Figure 1:
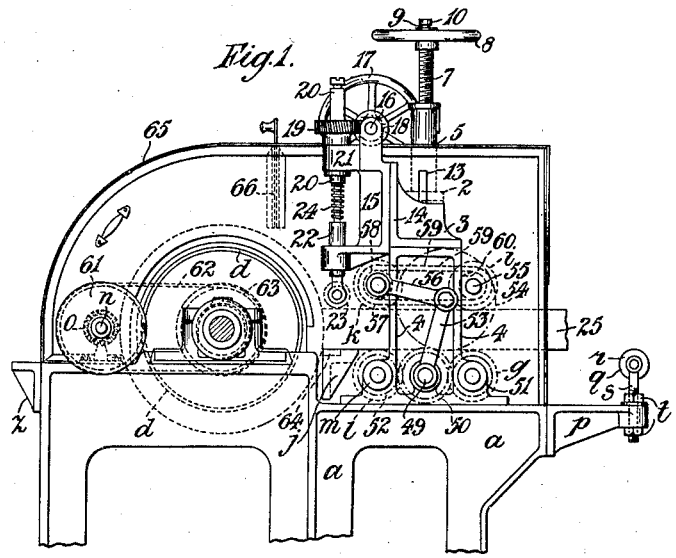
Figure 1 is a sectional elevation of the left hand side of a machine particularly suitable for grinding rubber or the like and embodying the improvements referred to but omitting the suction-fan for the sake of clearness.

For imparting motion endwise or axially, when necessary, to the abrading drum $d$ and also for communicating rotary motion to the lower feed rollers $g$ and $l$, one end of the shaft $c$ of the drum is furnished with a worm 29 (shown in Figure 2 in dotted lines) engaging a feather 30 (Figures 2 and 5) on the shaft $c$, the said worm being capable of rotating but prevented from moving axially owing to its being mounted in the bearing casing 31. The worm 29 engages a worm wheel 32 keyed to a shaft 33 (shown in dotted lines in Figures 2 and 5) mounted in upper and lower bearings in a bracket 34 fixed to the frame-work $a$. The worm wheel 32 is provided with a crank-pin 35 engaging in a slot in one end of a bell-crank lever 36 pivotally mounted on a stud 37 and the other end of the bell-crank lever is pivotally engaged at 38 with a collar 39 which is loosely mounted between two collars fixed on the shaft $c$ or in a groove in the shaft $c$ of the abrading drum $d$. Therefore, as the lever 36 is oscillated, it imparts endwise motion to the revolving drum $d$. The lower end of the worm-wheel shaft 33 has keyed thereto or mounted thereon a worm 40 which meshes with another worm-wheel 41, mounted on a horizontal shaft 42, rotatable in bearings in the bracket 34. This horizontal shaft is divided so as to form two shafts 42 and 43 (Figures 2, 3 and 4) in alignment. The adjacent ends of these shafts are connectible and disconnectible by a clutch 44. The shaft 43, beyond the clutch 44, is provided with a worm 45 (Figures 3 and 4) and a hand-wheel 46. The worm 45 engages a worm-wheel 47 (Figures 2 and 3) connected by a spring slip-coupling 48 to a cross-shaft 49 (Figures 1, 2, 3 and 4) mounted in bearings, on each side of the machine between the lower front feed-roller $g$ and the rear feed-roller $l$, the slip coupling being to enable the shaft 42 to continue revolving without feeding if the material engages the abrading drum too closely. Mounted on this cross-shaft 49 is a spur wheel 50 (indicated in dotted lines in Figure 1) engaging on one side with a pinion 51 keyed to the gudgeon of the front lower feed-roller $g$ and on the other side with a pinion 52 keyed to the gudgeon of the other lower feed-roller $l$. The shaft 49 of the spur wheel 50 has freely mounted thereon a pair of radius-rods or arms 53 (Figures 1, 2 and 3), between the free ends of which is mounted an intermediate spur-wheel 54, the stud 55 of which is, in turn, pivotally connected by a second pair of radius-rods 56 to the gudgeon or spindle of the rear upper feed-roller $k$, also provided with a pinion 57 engaging the intermediate spur wheel 54. The gudgeon at the other end of the feed-roller $k$ is provided with a sprocket-wheel 58 and a chain 59 transmits motion from that sprocket-wheel to a sprocket-wheel 60 mounted on the gudgeon of the front upper feed-roller $i$. Therefore, all four feed-rollers $g$, $l$, $k$ and $i$ are positively driven from the shaft 49 and the latter, in turn, derives its motion through the slipping coupling 48 from the shaft 43, dog-clutch 44, shaft 42, worm-wheel 41, worm 40, worm-wheel 32, worm 29, and the abrading drum shaft $c$. In view of the fact that the rubber should be withdrawn clear of the abrading drum before the machine slows down, and likewise should also be clear on starting before the proper speed of the drum has been attained to avoid the fusing of the rubber, it is preferable to be able to withdraw the rubber quite independently of the automatic feed and, consequently, if the rubber 25 or other material is to be fed by hand, it is only necessary to disconnect the horizontal shaft 43 by moving the sliding member of the clutch 44, mounted on the shaft 42, out of engagement with the clutch member keyed to the shaft 43 and then all four feed-rollers, $g$, $l$, $i$ and $k$ may be rotated by the hand-wheel 46 which is near the front of the machine and on the right hand side thereof. The rotary brush $o$ mounted in the bearings $n$ at the back of the abrading drum $d$ is driven by a pulley 61 (Figure 2) a belt 62 and a pulley 63 keyed to the shaft $c$ of the abrading drum. The bristles of this brush $o$ penetrate into the ventilating holes or slots between the abrading devices on the drum and prevent the powder from adhering to and choking them and a secondary object is achieved inasmuch as the brush also tends to prevent the teeth of the cutting devices from becoming clogged. In some cases, this brush $o$ may be fixed above or, indeed anywhere near the periphery of the abrading drum except in the vicinity of a mouth-piece 64 (Figures 4 and 6) or near the feeding device such as the rollers 23, $k$ and $l$. This mouth-piece 64 is detachable so as to be readily replaced by a new one when worn and it is mounted as shown in Figures 1, 4 and 6, on a cross girder $j$ angular in cross section and secured at each end to the side frames $a$. This girder is perforated so that any powder thrown over from the grinding drum $d$ can be drawn through the perforation by the draught set up by the fan to be presently described. In this case the girder is furnished with a single row of holes but there may be more than one row if desired. The upper and lower parts of the machine are, for the greater part, closed in with a casing 65 (Figures, 1, 2, 3 and 6) and of which the upper part or hood only is shown in Figure 1. The hood is, however, open in front where the material is fed to the machine and also at the sides in the neighbourhood of the inner periphery of the drum $d$ and down to the top of the frame-members $a$ so that air may have free access to the interior of the drum, and thence through the radial holes or slots therein to the interior of the casing and to the material being ground. The upper part of the casing 65, enclosing the abrading drum $d$, is conveniently made wholly or partly removable and is provided with an adjustable, vertically guided door or gate 66, Figures 1 and 6, mounted between the top of the casing and the drum $d$ and about midway between the central vertical plane in which the axis of the drum lies and the place where the grinding is effected to allow of intensifying or diminishing the pressure of the air currents to suit the character or consistency of the material under treatment.

The minute particles of rubber or other material are drawn out of the casing 65 by a fan 67 (Figures 2 and 6) driven at a high speed by a pulley 68 keyed to the shaft $c$ of the abrading drum, a belt 69 and a pulley 70 keyed to the fan-shaft. The suction side of the fan casing is connected by a conduit 71 to the casing 65 and the powdered material is delivered through the discharge orifice 72 by a pipe (not shown) into a collector from whence the powder may be bagged. Or a suitable fan might be mounted on the shaft $c$ itself to avoid the use of pulleys and belt. In order to facilitate the conveyance of the powder to the fan the bottom of the casing 65, is, as shown in Figure 6, made slanting from the front towards the rear of the machine, and an endless chain 73, with brushes 74 and mounted in suitable bearings on the frame members $a$, ensures that all powder, as produced, is brushed towards the mouthpiece 75 of the fan 67. This endless conveyor is conveniently driven as indicated in dotted lines in Figure 6 by means of a pulley 76 (also shown in full lines in Figure 2) mounted on the spindle of the rotary brush $o$, a belt 77 and a pulley 78 mounted on the lower shaft 79 of the endless conveyor.

According to the modification shown in Figure 8, generally applicable to machines of large dimensions, the upper feed-rollers (of which only the front roller $i$ is visible in this figure) are raised and lowered by hand by means of a worm-shaft 80 extending across the machine, mounted in bearings 81 and 82 and furnished with a hand-wheel 83. The worms 84 and 85 on the worm-shaft 80 mesh with worm wheels 86 and 87, respectively, and these worm-wheels are screw-threaded internally so as to act as nuts. In these worm-wheel nuts 86 and 87 engage the screw-threaded rods 88 and 89 which are preferably elastically mounted and fixed at their lower ends in a vertically guided H-shaped frame H, like the frame $h$ shown in Figures 2, 6 and 7. The arrangement of the rods 88 and 89 is the same as that of the rod 11 (Figure 6). It will be apparent that by turning the hand-wheel 83, keyed to the shaft 80, one way or the other, the frame H with the upper feed-rollers may be raised or lowered, as required, and the elastically mounted rods 88 and 89 enable the feed-rollers to rise or descend, if the material passing between the upper and lower feed-rollers varies in thickness, within certain limits.

Figure 9:
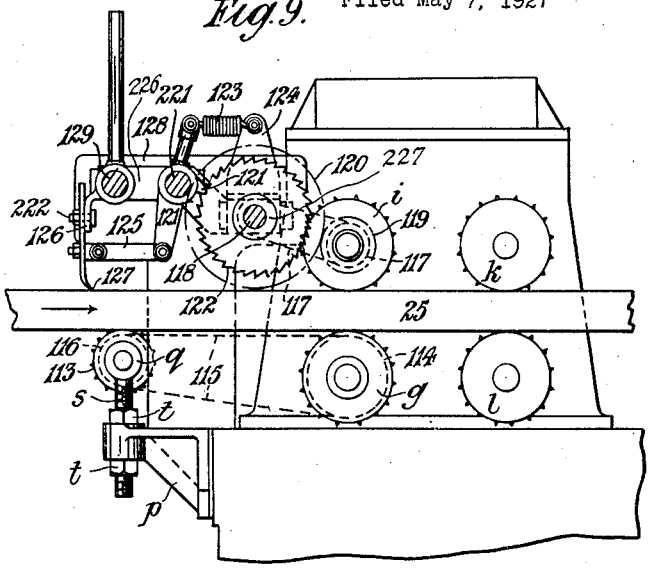
Figure 9 is a part sectional side elevation of a part of the machine showing means for feeding uniformly not only pieces of rubber of equal thickness but also rubber of thinner pieces and Figure 10 is a detail in front or end elevation thereof.
Figure 10:
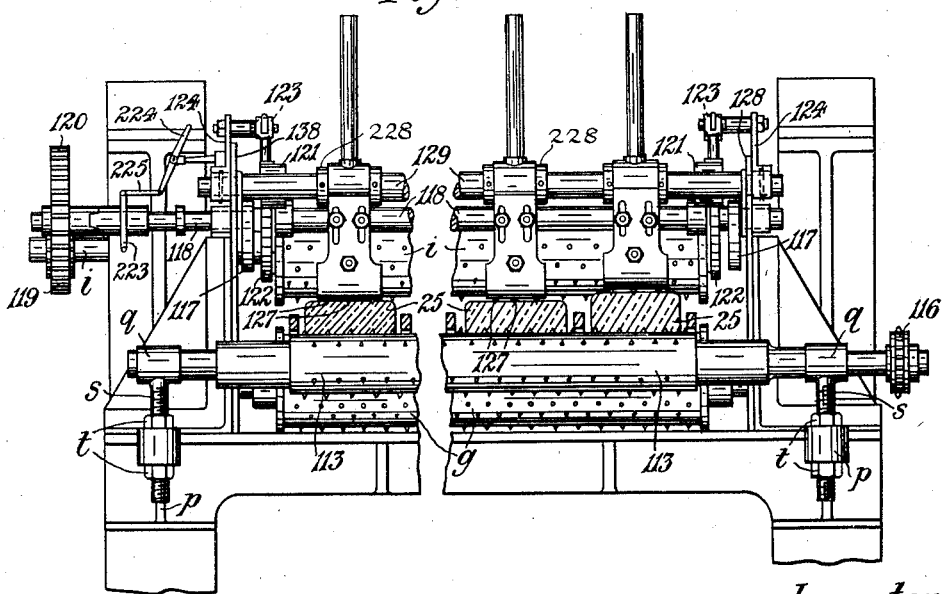

In order to be able to grind at the same time pieces of rubber of different thicknesses the apparatus is preferably provided, as shown in Figures 9 and 10, with an additional feeding device comprising a roller 113 furnished with spikes and mounted in the bearings $q$ integral with the screw-threaded stems $s$ secured by nuts $t$ to the brackets $p$. This feed-roller 113 is driven from a spur wheel 114 mounted on a gudgeon of the lower front feed-roller $g$ at the same peripheral speed as the latter by a chain 115 which also passes over a sprocket wheel 116 keyed to a gudgeon of the feed roller 113. In order also to feed positively from above the rubber 25, engaged by the spikes of the feed roller 113, the upper front feed roller $i$ has also mounted on its gudgeons links or radius rods 117 which carry at their free ends a spindle 118 which is driven from the gudgeon of the feed roller $i$ by means of spur wheels 119 and 120. The spindle 221 oscillates in bearings 226 slidable in slotted guides 128 and has mounted thereon at each end a double armed pawl lever 121, engaging in a ratchet wheel 122 and having its upper arm connected by a spring 123 to a stud fixed to a bracket 124 at each side on the machine while its lower arm is connected by a link 125 to the lower member of a double armed lever 126 provided with forks or spikes 127 for engaging in the rubber 25. The spindle 118 is mounted in bearings 227 at each side of the machine in slotted guides 128 and there are several doubled armed levers 126 fulcrumed on a rod 129 which is also mounted in the bearings 226 in the guides 128 one at each side of the machine. On rotary motion being communicated to the ratchet wheels 122, the pawls 121 are caused to alternately ride up and slip down into the ratchet teeth of the ratchet wheels thereby imparting oscillating movement to the forks 127 engaging the rubber and the latter is fed forward practically continuously towards the feed rollers $g$ and $i$ and in effect at a somewhat greater speed momentarily than that at which the rubber travels between the said feed rollers $g$ and $i$. The upper members of the levers 126 form handles which permit the fork to be engaged by hand with the rubber on starting. The spikes or forks 127 are adjustable as to height and are clamped in position on the double-armed levers 126 by nuts and bolts 222 to suit material of different thicknesses. The spiker or forks 126, 127 are loose on the spindle 129 and are kept in position by collars 228 which are clamped wherever required by set screws. The springs 123, one for each fork 127 constantly tend to return the fork to the position for commencing to feed the rubber and the pawl wheels carry it forward tooth-by-tooth towards the grinding drum *d*. When operating the clutches 44 and hand wheel 46 (Figs. 2 and 4) for reversing the motion of the feed, it will also be advisable to disengage the spur wheel 120. This wheel is loose on its shaft 118 and is connected thereto by means of a clutch 223 operated by a hand lever 224 and a link 225.

Figure 11:
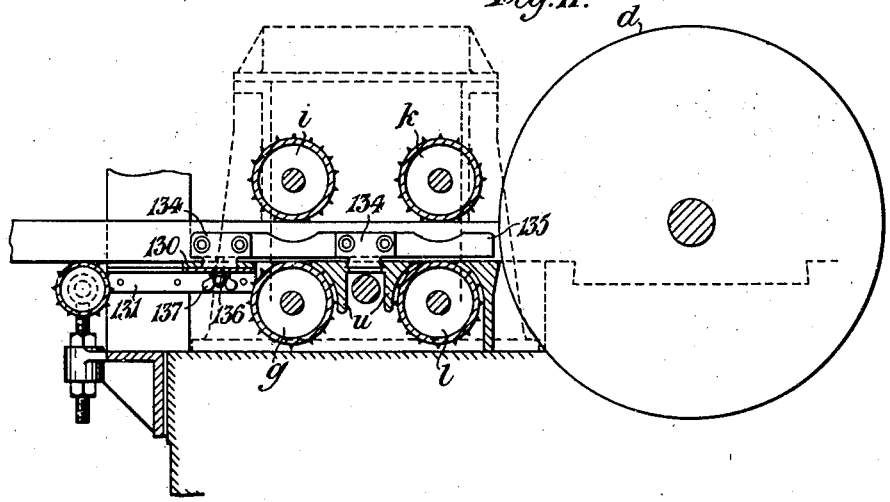
Figure 11 is a part sectional side elevation of a part of the machine illustrating the application of adjustable guides for the rubber and Figure 12 is a detail plan view.
Figure 12:
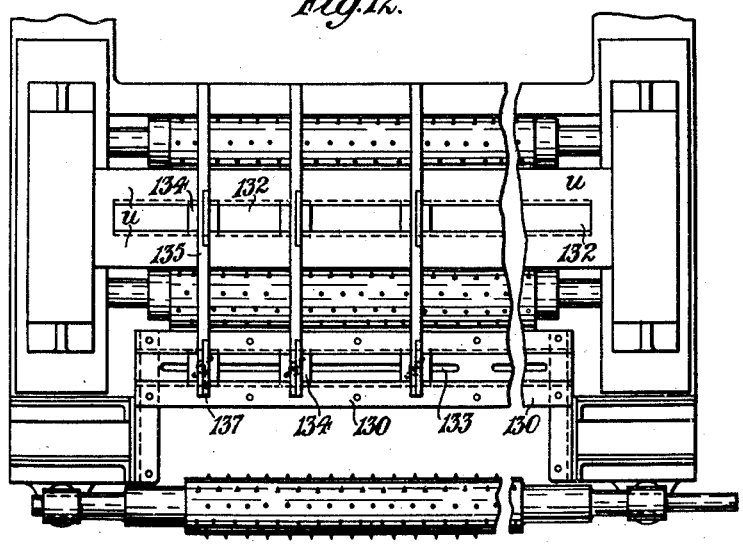

In order to permit of grinding rubber of varying widths, to apportion to each the necessary width of space in its progress to the feed rollers *g* and *i* and the abrading drum *d* the machine is, as shown in Figures 11 and 12, provided with two cross bars or, as shown, with a cross bar 130 which is supported on brackets 131 while the other cross bar is constituted by the table or bridge-piece *u*. Each of these parts 130 and *u* is slotted. The latter is provided with a slot or slots 132 and the cross bar 130 has two slots 133. These slots are of dovetail cross section and are adapted to receive correspondingly formed lugs 134 fixedly mounted on guiding bars 135 and in the case of the lugs 134 engaging in the cross bar 130 each front lug on a guide 135 is provided with a screw 136 and a wing nut 137 so that the guide bars may be fixed wherever required above the cross bars 130 and table *u* or they may be released and some of the guides pushed to one side and others to the other side and again clamped when not required.

On referring to Figures 13, 14 and 15, it will be seen that the abrading drum comprises two flanged discs *d*, each mounted on the shaft *c* and provided with a central hollow cylindrical portion 90, furnished with the inwardly directed and tangentially disposed vanes *e* extending about half-way between the inner periphery of the central drum portion 90 and the drum shaft *c*, and a number of annular series of radial holes or slots 91. The discs *d* are also provided with a number of axial holes 92, disposed equidistantly between the shaft *c* and the central drum portion 90, for the admission of air to the interior of the drum, whence it is drawn by the vanes *e* and delivered through the radial holes 91. Between the radial holes or slots 91 are mounted groups of externally serrated, hard steel cutting rings 93, spaced apart by annular distance-pieces 94, radially perforated or slotted at 95 and of an external diameter less than that of the cutting rings. The end discs *d d* and the central portion 90 of the drum are held together by bolts 96 and the cutting rings 93 and the distance-pieces 94 are securely clamped in place on the central portion by set-screws 97, passing through screw-threaded holes in the discs *d* and provided with lock-nuts 98. The outer faces of the annular distance-pieces 94 are recessed or grooved in order to reduce friction in working.

Or according to another modification, and as shown in Figure 16, the abrading drum, consisting as before of the hollow cylindrical central portion and the discs *d*, is provided with a number of groups of hard steel elliptical rings 110, externally serrated and separated by a number of radially slotted or perforated elliptical distance pieces 111. At the end of a terminal groups or series of these cutting rings 110 there is a wedge-shaped ring 112 forming a terminal distance-piece so that all the intermediate distance-pieces 111 and the cutting rings are inclined to the axis of the drum instead of being in planes perpendicular to the axis, as in the construction described with reference to Figures 9, 10, and 11. The cutting rings 110 and distance-pieces 111 and 112 are finally clamped by the set-screws 97. An abrading drum of the kind described with reference to Figure 16 need not be reciprocated to ensure that the cutters pass over the whole area of the rubber or material being cut because the rings wobble as they rotate. The internal arrangement of the drum is not illustrated in Figure 16, but it is the same as described with reference to Figures 13, 14 and 15.

Or according to yet another modification and as shown in Figures 17 and 18 the whole grinding drum is cast in one piece with radial slots 140 through which the cooling air passes, cutting teeth 141, integral with the shell of the drum and in between each two air slots and internal curved tangential impeller vanes 142 while each end is constituted by a boss 143, spokes in the form of vanes 144, an intermediate rim 145 around the outer tips of the vanes, annular closed ends 146 and annular radial ribs 147. If desired the end vanes 144 may extend from the boss to the inner periphery of the drum and the annular closed ends 146 are then dispensed with. It will be noticed that the shell is formed at the root of each cutting tooth more or less of diamond section so as to present as large a surface as possible to the air for cooling. The teeth may be used as they leave the mould or they may be machined or sharpened if desired. While the construction shown is provided with teeth arranged in axial rows it will be obvious that they may be arranged in ring form or in the form of a helix with intervening air holes or slots for cooling purposes. If desired the grinding drum may be formed of parts cast separately, that is to say, the shell may be in one piece or in segments and the ends may also be separate.

The more or less diagrammatic Figures 19 and 20 illustrate a complete installation for carrying out the grinding and grading of rubber or the like and it comprises an electric motor 150 or other prime mover which drives the grinding machine 151 by belt 152 and the exhaust fan 67, driven by pulleys and belt 153 from the grinding drum shaft c, delivers air laden with rubber dust or powder into the collecting chamber 154. The latter conveniently consists of a framework with a series of gable roofs or tops 155 covered with cotton or fabric to increase the surface for the escape of air while retaining the comminuted rubber which settles in the said chamber. At the end of the latter is a screw-conveyor 156 to which the comminuted rubber is conducted for example, by brushes on endless chains 164, driven from the shaft of the screw-conveyor 156, or down an inclined plane by gravity or in any other convenient manner. Motion is communicated to the endless conveyor 156 from a shaft 157 driven by pulleys and a belt 158 from the drum shaft c and from the shaft 157 by pulleys and belt 159. The shaft 157 also by pulleys and belt 160 drives an elevator 161 which delivers the ground rubber to a sifter 162 for grading, and this sifter is also suitably driven by pulleys and belt 163 from the said shaft 157.

I claim:

1. Apparatus for grinding india rubber and other materials comprising a framework, a rotary abrading drum, a feed table, a plurality of feed rollers associated with said feed table, a plurality of elastically mounted feed rollers disposed in a plane substantially parallel with and above said feed table, means for vertically adjusting the last mentioned feed rollers, and means for positively driving all of said feed rollers.

2. Apparatus for grinding india rubber and other materials comprising a framework, a rotary abrading drum, a feed table, a plurality of feed rollers associated with said feed table and of a length approximating to the width of said drum, a second series of feed rollers of substantially the same length as and disposed above the first-mentioned feed rollers, a vertically adjustable frame carrying the second-mentioned feed rollers, a single operative means for vertically adjusting said frame, and means for positively driving all of said feed rollers.

3. In apparatus for grinding india rubber and other materials, the combination with a framework, a rotary abrading drum and a plurality of positively driven upper and lower feed rollers, of a perforated table disposed between the lower front and rear feed-rollers and level with the top of said rollers, the said table being provided at the front and rear with curved lips depending therefrom concentric with and covering a portion of the periphery of the said rollers below the table, substantially as set forth.

4. In apparatus for grinding india rubber and other material, the combination, with a rotary abrading drum, a plurality of positively driven upper and lower feed rollers and a mouth piece disposed between a rear lower feed roller and the abrading drum of a vertically adjustable and elastically mounted roller extending over and above the mouth piece for engaging and pressing the material onto said mouthpiece while being fed towards the abrading drum, substantially as set forth.

5. In apparatus for grinding india rubber and other material the combination with a rotary abrading drum, a driving shaft and gearing for driving a plurality of feed rollers from the driving shaft at a relatively slow speed, of a slipping coupling and a positively operated clutch interposed between the driving shaft and the feed rollers and means for manually rotating the feed rollers substantially as set forth.

6. In apparatus for grinding india rubber and other material, the combination of a framework, a rotary abrading drum, a driving shaft, bearings for the driving shaft on the said framework, a worm on the said shaft, a worm-wheel engaging with the said worm, the said worm-wheel mounted at one end of a short vertical shaft, bearings on the framework for the said vertical shaft, a worm mounted on the other end of said vertical shaft, a worm-wheel meshing with the worm of the vertical shaft the worm-wheel last referred to mounted on one end of a horizontal split shaft, the said split shaft, bearings on the framework for the said split shaft, a positively operating clutch uniting the adjacent ends of the split shaft, a hand wheel at the other end of the split shaft, a worm on the end last referred to of the split shaft, a cross shaft, bearings on the framework for the said cross shaft, a worm wheel on the said cross shaft meshing with the worm last referred to, a slipping coupling, a spur wheel on the cross shaft and a pinion on each lower feed roller engaging the said spur wheel, substantially as set forth.

7. In apparatus for grinding india rubber and other material, the combination, with a framework, a rotary abrading drum, a driving shaft, bearings on the said framework for the driving shaft, and a plurality of lower feed rollers, of a cross shaft, a spur wheel on the said cross shaft for driving the said feed rollers, pinions on the said feed rollers meshing with the said pinion on the cross shaft for driving the said feed rollers, a pair of radius rods freely mounted at one of their ends on the said cross shaft and carrying at their other and free ends a short shaft on which is mounted an intermediate spur wheel meshing with the spur wheel on the cross shaft, the said short shaft being similarly connected by another pair of radius rods to the spindle of one of a pair of upper feed rollers the said second pair of radius rods, the said upper feed rollers, a pinion at one end of the spindle of one of the upper feed rollers meshing with the intermediate spur wheel and means for transmitting motion from the said upper feed roller, to the other upper feed roller, substantially as set forth.

8. In apparatus for grinding india rubber and other material, the combination, with a framework, a rotary abrading drum, a driving shaft, bearings on the said framework for the driving shaft and a plurality of parallel lower feed rollers of a length approximately the width of the drum, of a plurality of upper feed rollers of corresponding length, a vertically guided, adjustable and elastically mounted frame, bearings in the said frame for the said upper feed rollers, means for guiding the said frame vertically on the framework and elastic means interposed between the framework and the said frame for causing the upper feed rollers, mounted in the frame, to press elastically on the material being fed substantially as set forth.

9. In apparatus for grinding india rubber and other material, the combination, with a framework, a rotary abrading drum, a driving shaft, bearings on the said framework for the driving shaft, a plurality of lower feed rollers and means for communicating motion from the driving shaft to the said feed rollers, of a vertically guided adjustable and elastically mounted frame comprising side-members and a cross bar connecting the said side members, a vertical rod on the said cross bar the said rod being of larger diameter near the bottom than at the top a plurality of upper feed rollers of a length approximating to the width of the drum mounted in bearings in the said frame, means for communicating motion to the said upper feed rollers from the lower feed rollers, a bridge-piece connecting together the framework on each side of the apparatus, guides on the said framework for the said frame, a socket on the said bridge-piece through which the said rod passes, a nut in the said socket, a hollow screw engaging in the said nut, a handwheel mounted on the said hollow screw, the said rod passing up the hollow screw, a collar at the top of the said rod to prevent it from dropping through the hollow screw, and a spring interposed between the nut and the enlarged part of the said rod for causing the said upper feed rollers to press elastically on the material being fed to the abrading drum substantially as set forth.

10. Apparatus for grinding india rubber and other material, comprising in combination, a framework, a rotary abrading drum, a feed table, a plurality of lower feed rollers associated with said feed table, means for imparting rotary motion to the said feed rollers, a plurality of upper feed rollers arranged in a plane substantially parallel with and above the lower feed rollers, means for imparting rotary motion to said upper feed rollers, an additional feeding device comprising a feed roller provided with means for closely-engaging the material on its way to the said plurality of feed rollers, and means for positively driving the additional roller.

11. In apparatus for grinding india rubber and other material, the combination, with a framework, a rotary abrading drum, a driving shaft, bearings on the said framework for the driving shaft, a plurality of lower feed rollers, means for imparting rotary motion to the said feed rollers, a plurality of upper feed rollers and means for imparting rotary motion to said upper feed rollers, of additional feeding devices comprising a feed roller provided with means for closely engaging and forwarding the material on its way to the said plurality of feed rollers, bearings for the said feed roller, means for positively driving the said roller, a plurality of pivotally mounted spike devices mounted on a fulcrum rod, the said rod, guides in which said rod is adapted to reciprocate bodily a ratchet wheel at each side of the machine, a double armed pawl lever engaging in each ratchet wheel, a spindle on which the ratchet wheels are mounted a spur wheel mounted on the shaft of one of the upper feed rollers, a spur wheel mounted on the said spindle, bearings for the said spindle, guides in which the said bearings slide, radius rods connecting the spindle of the said feed roller and the other said spindle, a spindle on which the said pawl levers are mounted, bearings on each side of the machinery for the said pawl levers' spindle, links connecting the lower member of the ratchet levers to the pivotally mounted spike devices and springs for constantly pressing the ratchets into engagement with the ratchet wheels substantially as set forth.

CHARLES EDWARD GARDNER.